United States Patent [19]

Baker et al.

[11] Patent Number: 4,740,927

[45] Date of Patent: Apr. 26, 1988

[54] BIT ADDRESSABLE MULTIDIMENSIONAL ARRAY

[75] Inventors: David C. Baker; John S. Muhich, both of Austin, Tex.

[73] Assignee: International Business Machines Corporation, Armonk, N.Y.

[21] Appl. No.: 701,328

[22] Filed: Feb. 13, 1985

[51] Int. Cl.⁴ .............................................. G11C 13/00
[52] U.S. Cl. ..................................... 365/238; 365/189; 340/792
[58] Field of Search ........................ 365/189, 238, 231; 340/792

[56] References Cited

U.S. PATENT DOCUMENTS

| | | | |
|---|---|---|---|
| 2,736,880 | 2/1956 | Forrester | 365/130 |
| 3,763,480 | 10/1973 | Weimer | 365/238 |
| 3,772,658 | 11/1973 | Sarlo | 365/238 |
| 4,249,172 | 2/1981 | Watkins et al. | 340/726 |
| 4,291,305 | 9/1981 | Kimura et al. | 340/734 |
| 4,442,503 | 4/1984 | Schutt et al. | 364/900 |

OTHER PUBLICATIONS

"Memory Systems for Image Processing", authored by D. C. Van Voorhis & T. H. Morrin, IEEE Transactions on Computers, vol. C-27, No. 2, Feb. 1978, pp. 113-125.

Primary Examiner—Terrell W. Fears
Attorney, Agent, or Firm—J. F. Villella, Jr.; Andrea P. Bryant; H. St. Julian

[57] ABSTRACT

A memory array associated with a display can be accessed in either one of two substantially orthogonal directions. The memory array is structured so that it may be accessed, such as for reading or writing, in either the horizontal or vertical direction. Pel position representations in the array are arranged so that vertically sequential pel positions in a given column are represented by data in sequential memory modules rather than by data in the same memory module. Likewise, horizontally sequential pels in a given row are represented by data in sequential modules rather than in the same module. The memory array is comprised of a plurality of separate memory modules and is structured so that both x and y directional accessing into and out of the array is accomplished on a bit addressable x,y field. This enables any bit string in the array to be addressed and to be read from or written into the array in either the x or y direction. No word or byte boundaries exist in either the x direction of access or the y direction of access.

6 Claims, 4 Drawing Sheets

FIG. 2

BIT ADDRESSABLE MULTIDIMENSIONAL ARRAY

DESCRIPTION

TECHNICAL FIELD

The present invention relates to the accessing of information in a memory array and, more particularly, to the two dimensional accessing of information in a memory array associated with a display.

BACKGROUND ART

Typical information processing systems include one or more video display terminals for providing a visual output of information. This visual output is in the form of an image. Such an image can be represented by any two dimensional array of image points represented by bit values stored at predetermined positions in a memory array made up of columns and rows of memory modules or chips. In order to process an imaging operation on the display terminal, it is required that an image or some part of an image be stored in a memory system which typically includes a memory array. Means must be provided for permitting access to sequences of image points along any row or column of the memory array. Such access to the memory array is required in order to write new information on the face of the display terminal as well as to refresh such information as required by a cathode ray tube (CRT) display terminal. Some other typical operations include rotating the image on the display as well as filling in a pattern on the display.

A problem that exists with raster scan displays, such as CRTs, which are all points addressable (APA), is updating the display memory array. In an all points addressable display system, hardware is required during memory update in order to perform detailed operations such as bit shift, mask, and merge.

One technique for implementing a refresh operation involves providing a two dimensionally addressed memory array in which no word or byte boundaries exist. That is, for each of the picture elements (pels) addressable in the memory array, there exists an X-Y address pair which uniquely locates that pel. Furthermore, whenever the array is accessed, multiple pels are written to or read from the memory array in a bit vector parallel to the direction of access to the array. A predetermined number of pels can be written into or read from the memory array in a single memory cycle beginning at any X-Y position without concern for what would ordinarily be the memory array's word boundary constraints.

With this addressing technique, hardware associated with the memory array recognizes which memory module in the array will be the starting point. The starting memory module is given the address n. Each memory module from the starting memory module to the module immediately following the starting point in the refresh operation is then given the address n+1. As a consequence, access to as many pels as there are memory modules in the refresh array in a single cycle is provided beginning at any X-Y pel position without concern for word boundaries.

A second technique for enhancing accessing of a memory array is the ability to support variable width write operations. To this end, a width control register can be provided to control the number of bits actually modified by a write cycle. Using this technique, once the starting point is identified for a given write cycle, a write operation is enabled to all the modules in the memory array. The modules in the memory array are written sequentially until the last module is reached. At this point, the write operation wraps back to the first module and continues until the specified width control register value is reached. Combining these two techniques provides the capability to access any number of pels up to the refresh array width at any arbitrary X-Y pel position. This is done as a bit vector parallel to the direction of access in a single cycle without regard to the memory array word boundaries.

U.S. Pat. No. 4,249,172 describes a display addressing system for accommodating vertically and horizontally varying entry points in a video memory. A memory link table has display memory addresses stored therein which point to first character bytes of video display rows. Logic circuitry transfers the memory address stored in the table to a memory address counter which, upon initialization, points to a first character byte of a first row of video information. The counter is then incremented to point to and thus display successive rows of video information.

In U.S. Pat. No. 4,442,503, assigned to the same assignee as the present invention, there is described a technique for enabling the two dimensional addressing of a display memory. The technique utilizes a storage unit for storing both blocks and rows of data and for retrieving rows of data. The storage unit operates in an interleaved mode, thus permitting two dimensional addressing over a plurality of separately addressable modules within the storage unit.

In an article entitled "Memory Systems for Image Processing", IEEE Transactions on Computers, Vol. C-27, No. 2, February 1978, pages 113-125, there is described an image supporting memory system which can be accessed in only the horizontal direction. The accessing of information in the horizontal direction in a memory array is quite typical in the prior art.

Heretofore, the accessing of information in a memory array for a display in both the horizontal and vertical directions has not been disclosed. The accessing of memory arrays in both a horizontal and vertical direction would greatly enhance memory array performance. For example, structures, such as lines on a display, that are represented as near colinear sequences of bits, which are either near vertical or near horizontal, can be written or refreshed as multiple bits per cycle. Structures, such as characters, which naturally tend to be taller than they are wide, can be written to a memory array as vertical slices instead of horizontal slices, thereby requiring fewer accesses to the memory array.

DISCLOSURE OF THE INVENTION

Accordingly, it is an object of this invention to provide an improved method and apparatus for accessing a memory array associated with an image processing system.

It is another object of this invention to provide a method and apparatus for enabling horizontal and vertical accessing of a memory array in an image processing system.

In accordance with these and other objects, there is disclosed a technique for restructuring a memory array so that it may be accessed for writing and refreshing, as well as reading, in either the horizontal or vertical direction. The array comprises a plurality of separate memory modules. The vertical and horizontal accessing capability is accomplished by arranging representations of pel positions in the array so that vertically sequential pel positions in a given column are represented by data in sequential modules rather than by data in the same module.

The memory array is structured such that both X and Y accessing into and out of the memory array is accomplished on a bit addressable X, Y field. This enables any bit string in the array to be addressed and to be read from or written into the array in either the X or Y direction. The dimensional access input to the array allows the switching between X direction accessing and Y direction accessing. No word or byte boundaries exist in either the X direction of access or the Y direction of access.

The number of bits that can be written into the memory array in either the X direction or the Y direction can be controlled by using a write width input to the memory array. This write width input controls the number of bits that are written into the array. The total number of bits is dependent upon the memory width of the array, that is, one, up to the memory width of the array number of bits may be written into the array. Additionally, a partition select input associated with the array allows the bits in the array to be logically positioned in different X, Y sizes. Combined with the dimensional access input capability, switching from landscape to portrait type profiles in an all points addressable (APA) display system is readily effected. By a landscape display is meant one that is wider than it is long, while a portrait type display refers to a display that is longer than it is wide.

BRIEF DESCRIPTION OF THE DRAWING

FIG. 2 is an illustrative example of the logical placement of bits in an addressable memory array according to the present invention.

BEST MODE FOR CARRYING OUT THE INVENTION

Figure 1:
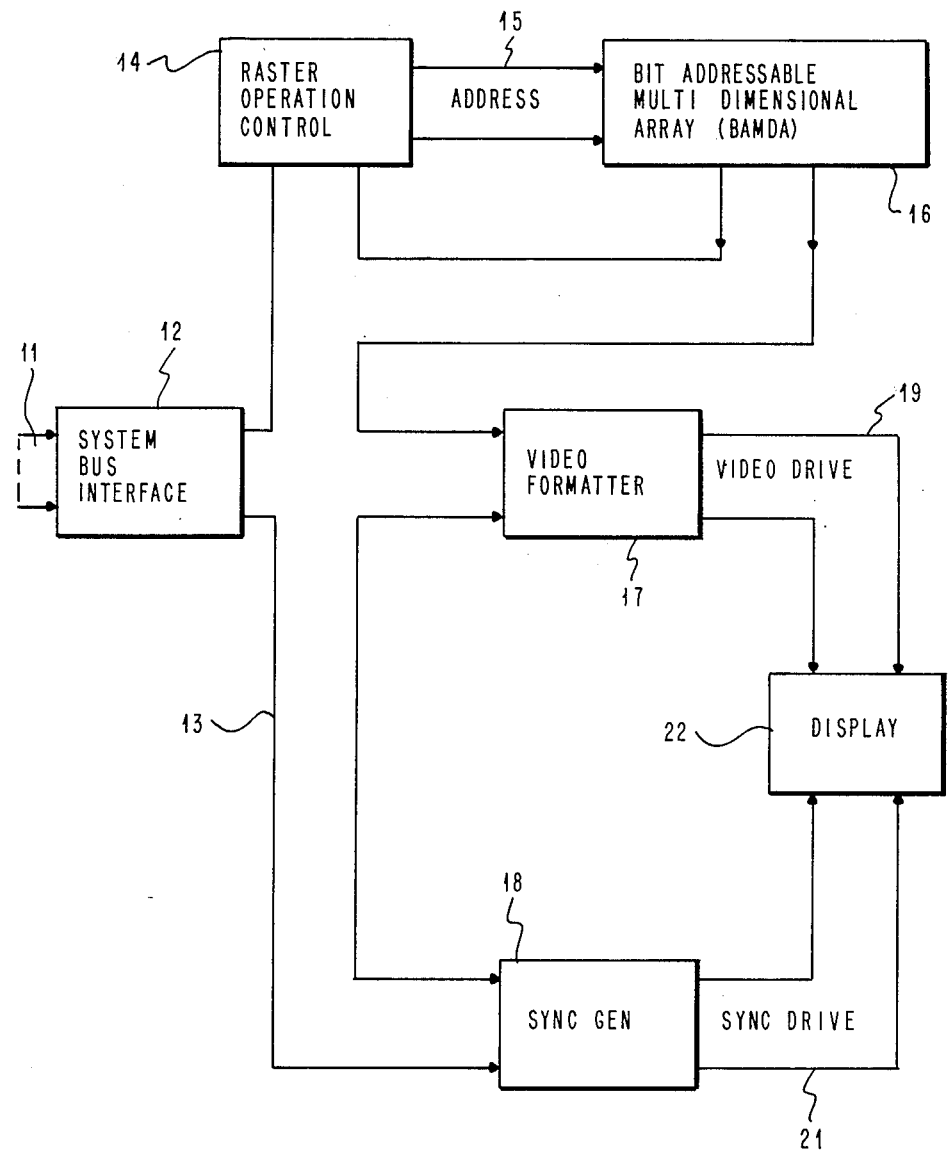
FIG. 1 is an overall block diagram of a display system according to the present invention.

FIG. 1 illustrates in functional block form a video display system in which information is input over system bus 11 to system bus interface 12 and display system bus 13. Raster operation control 14 receives such information and generates over address bus 15 which are input to bit addressable multidimensional array (BAMDA) 16. Data that is either read out of or written into BAMDA 16 is then provided to display 22 through video formatter 17 via video drive 19. Sync generator 18 controls the horizontal and vertical synchronization of display 22 over sync drive bus 21. The invention disclosed herein is embodied primarily in BAMDA 16. The operation of raster operation control 14, video formatter 17, sync generator 18, and display 22 is well known in the visual display art and will not be detailed further herein.

Figure 2:
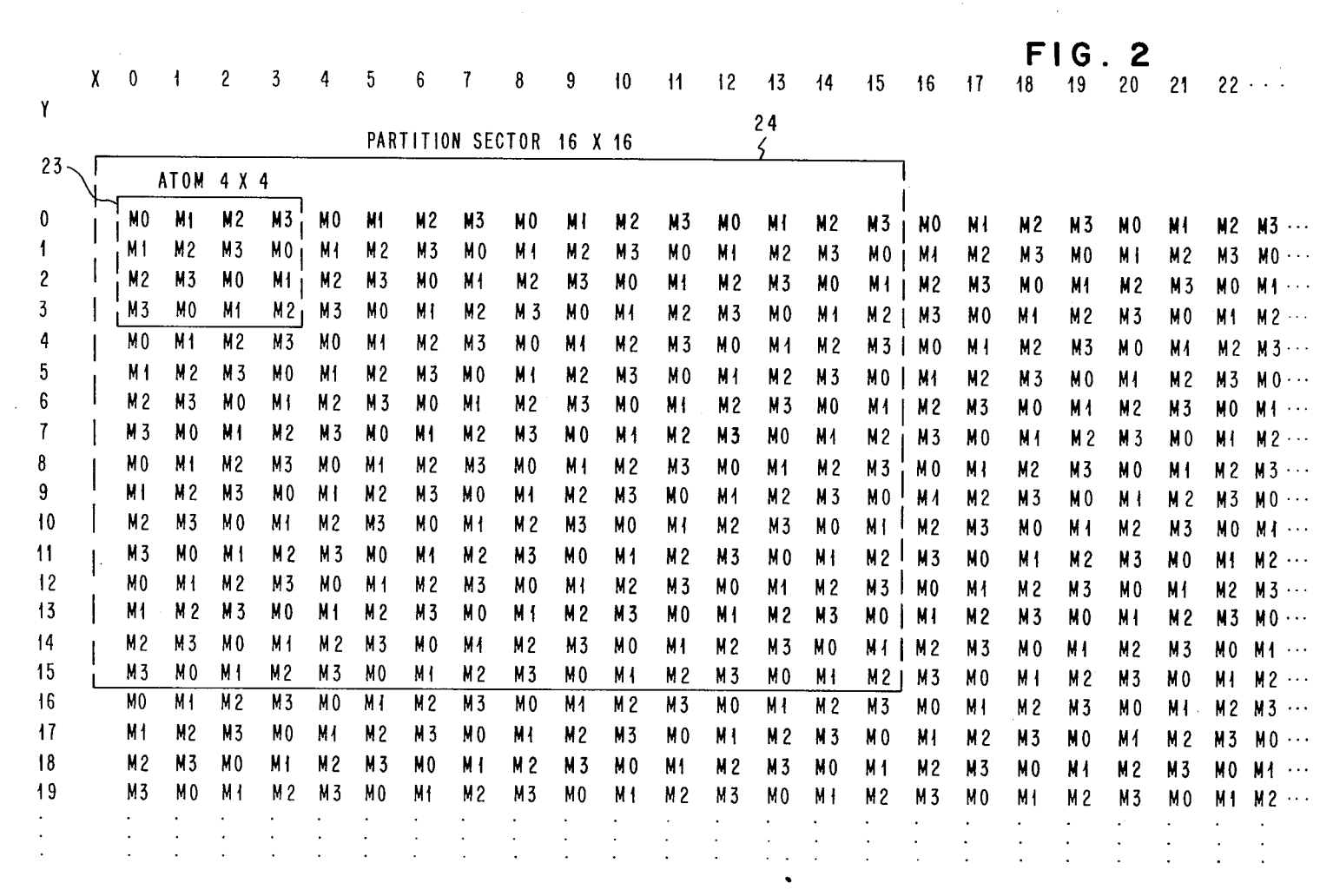

FIG. 2, which illustrates the logical placement of bits in BAMDA 16, represents a four-bit wide memory structure but is easily expandable to an n-bit wide memory structure. M0, M1, M2, and M3 represent four different memory array modules within BAMDA 16. Each of modules M0-M3 has eight independent addresses and each has an independent write line. The bits in BAMDA 16 are arranged on a diagonal so that all four bits that is, one from each of memory modules M0-M3 are accessed each memory cycle independent of the direction of access. The key concept of the present invention is that the bits in BAMDA 16 may be accessed either horizontally or vertically.

The smallest element in BAMDA 16 is square matrix 23. The size of square matrix 23 is nxn where n is the number of memory modules in BAMDA 16. In FIG. 2, since BAMDA 16 has four memory modules, then the size of matrix 23 is $4 \times 4$. Matrix 23 is the smallest repeatable array element contained within BAMDA 16.

The next biggest element in BAMDA 16 is a partition sector 24 which comprises several matrices such as matrix 23. The number of bits in partition sector 24 is equal to the number of bits in a single memory module. Since each memory module has eight independent addresses, the number of bits in partition sector 24 is equal to $2^8$, or 256 bits. As shown in FIG. 2, partition sector 24 is a $16 \times 16$ matrix. The size of a partition sector in BAMDA 16 depends upon the size of the address field in memory modules M0-M3. The $16 \times 16$ matrix of partition sector 24 is addressed with two 4-bit address fields, that is, there exists a matrix that is $2^4 \times 2^4$. The number of partition sectors contained within BAMDA 16 is equal to the number of memory modules contained within BAMDA 16. Therefore, for an array with four memory modules, there would be four partition sectors. Note that due to space constraints, only one partition sector, that is, partition sector 24, is shown in FIG. 2.

Figure 3:
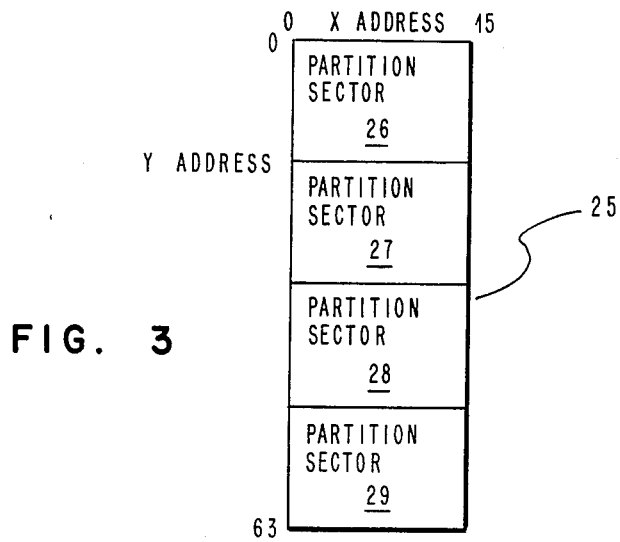
FIG. 3 is an illustrative example of a memory array having four partition sectors according to the present invention.
Figure 4:
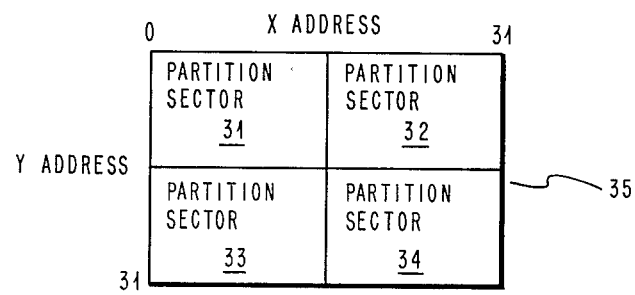
FIG. 4 is another illustrative example of a memory array having four partition sectors according to the present invention.
Figure 5:
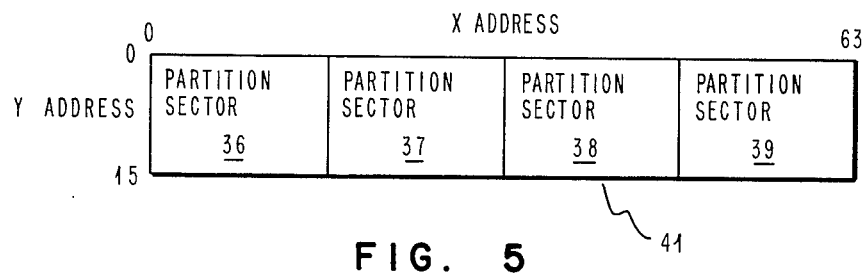
FIG. 5 is yet another illustrative example of a memory array having four partition sectors according to the present invention.

FIGS. 3, 4, and 5 depict three different array configurations for BAMDA 16. Array 25, which comprises partition sectors 26-29, is a $16 \times 64$ array. Array 35, which comprises partition sectors 31-34, is a $32 \times 32$ bit array. Array 41, which comprises partition sectors 36-39, is a $64 \times 16$ bit array. Each of the partition sectors 26-29 in array 25, partition sectors 31-34 in array 35, and sectors 36-39 in array 41, are $16 \times 16$ bit in size. A partition select input value represents the number of partition sectors in the X direction. Thus, array 25 has a partition select input value of 1, while array 41 has a partition select input value of 4. The partitioning of an array can easily be extended to any array size with any number of memory modules. For example, if the number of memory modules is equal to eight, then the possible partition select input values may be 1, 2, 4, or 8. These four input values would represent array sizes of $1 \times 8$, $2 \times 4$, $4 \times 2$, and $8 \times 1$, respectively.

Figure 6:
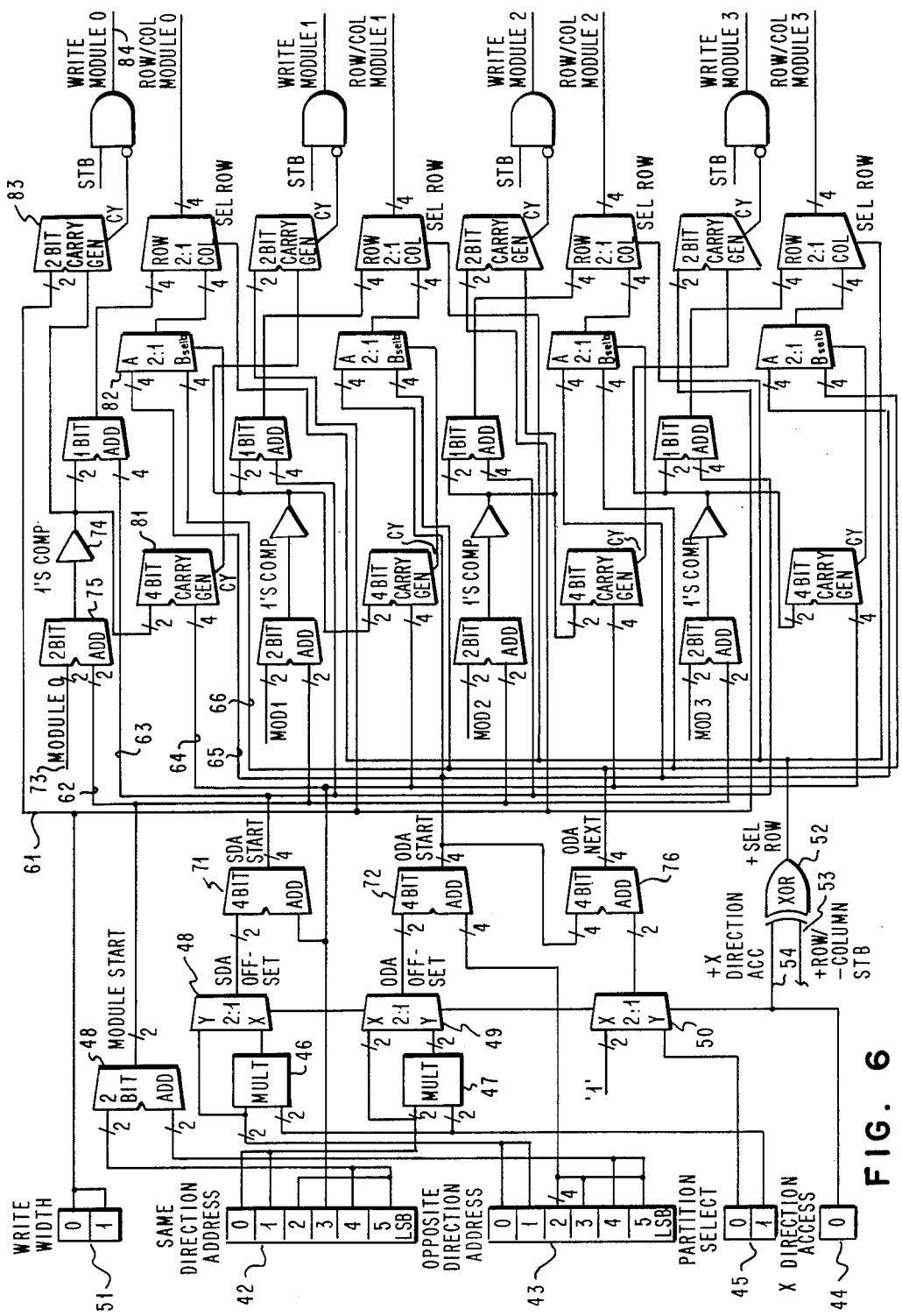
FIG. 6 is a logic diagram of the addressing circuitry associated with the memory array of the present invention.

In FIG. 6 is shown the logic necessary to generate the addresses and the write lines for each of modules M0-M3 in BAMDA 16. A four-bit row and a four-bit column address are generated to each of modules M0-M3 on a common set of multiplexed address lines, 61-66, which are controlled by the row column strobe input 53. When changing access direction from x to y or vice versa, the row/column address fields are switched by the exclusive OR function embodied in gate 52. The two address inputs shown in FIG. 6 are same direction address (SDA) 42 and opposite direction address (ODA) 43. SDA 42 provides the x direction address when x direction access input 44 is equal to 1. SDA 42 provides the y direction address when x direction access input 44 is equal to 0. Likewise, ODA 43 provides the y direction address when x direction access input 44 is equal to 1, and provides the x direction address when x direction access 44 is equal to 0. The x,y address presented to BAMDA 16 represents the exact starting bit location regardless of the direction of access. Additionally, the two dimensional x,y address indicates which of memory modules M0–M3 is to be the starting position from which the first bit is accessed. The direction of access has no effect on the module starting position. The module start is generated by adding the two least significant bits of both SDA 42 and ODA 43, and dropping any carry outs that occur during the two-bit add operation.

An SDA 42 offset value is output from multiplexor 48. When BAMDA 16 is operating in the x directional access mode, the offset value of SDA 42 is equal to the two most significant bits in ODA 43 times the input value of partition select 45. This multiplication takes place in multiplier 46. When BAMDA 16 is in the y directional access mode, the offset value of SDA 42 is equal to the two most significant bits of ODA 43. An offset value for ODA 43 is generated in much the same manner as the offset value for SDA 42, except the conditions for choosing the most significant bits versus the least significant bits are switched. The two offset values generated thusly enable the addressing of different partition sectors within BAMDA 16. Both offset values are equal to 0 when accessing partition sector 0. The starting bit depicted by the x,y address input will always fall within the partition sector generated by the sum of the offset values of SDA 42 and ODA 43.

The starting position for SDA 42 is generated by adding the four least significant bits of SDA 42 to the offset value of SDA 42. The starting position for ODA 43 is generated by adding the four least significant bits of ODA 43 to the offset value of ODA 43. As can be seen in FIG. 6, the SDA starting value is generated by adder 71, while the ODA starting value is generated by adder 72. Only the four least significant bits of the SDA 42 and ODA 43 fields are used because each of memory modules M0–M3 has two four-bit wide addresses that are multiplexed into the array modules. These two starting values represent the exact row/column address of the starting bit to be accessed. Together with these start addresses and the module start value, which is generated by two-bit adder 48, the exact starting bit in the proper memory module is accessed.

A module pointer is generated from the module start (output of adder 48) and the module number. For example, a module start value is output from adder 48 and added with module 0 in adder 75 which is then output to one's complement 74. The output of one's complement 74 is then the module pointer for module 0. The module pointer represents a sequential string of numbers starting from 0 up to the total number of memory modules in BAMDA 16. There is one and only one module pointer that has a 0 value during a memory access. The module pointer that has this value of 0 also points to the one of memory modules M0–M3 where the starting bit is located. For example, if memory module M2 has the starting bit in it, then memory module M3 has the next consecutive bit in it. Similarly, memory module M0 has the third consecutive bit in it. When starting with memory module M2, the module pointer for that M2 is equal to 0. Subsequently, the module pointer value for memory module 3 has a value of 3, the next memory module which is M0 then uses a module pointer value of 0 to generate its addresses. The values of such module pointers supply the sequential offsets to generate the sequential address and also the appropriate starting point in the memory modules.

When accessing a four-bit string in the x-direction, there are only two unique row addresses required, the starting address and the starting address plus one. These two addresses are represented by the ODA 43 start value, which is output from adder 72, and the ODA 43 next value, which is output from adder 76. The ODA 43 next value is generated by adding the ODA starting value output from adder 72 to one when BAMDA 16 is in the x-directional access mode.

The column address field remains constant within a partition sector when accessing in the y direction. Therefore, when accessing a four-bit string in the y direction, there are only two unique column addresses needed for the four memory modules, M0–M3. These two unique column addresses are the starting address and the starting address plus the partition select value. The start address and the start address plus partition select value are represented by the ODA start value and the ODA next value when operating in the y directional access mode. The ODA next value is generated by adding the ODA start value to the partition select value when in this y directional access mode. For accesses to BAMDA 16 that are contained in a given partition sector, the ODA next address is not used. For accesses that cross partition sector boundaries, both the ODA and the ODA next values are used.

The selection of which one of ODA 43 addresses is to be used for each independent memory module is generated by the carry select signal for that module. The carry select value, ranging from 0 to 3, is generated from the four least significant bits of SDA 42 and the module pointer for that module. These two quantities are added together to form a carry bit. For example, for module 0, the module pointer output from one's complement 74 is input to four-bit carry generator 81. The other input to carry generator 81 is the four least significant bits of SDA 42. A carry bit is then output from carry generator 81 and input to 2:1 multiplexor 82. When the carry select signal becomes active, the ODA next value is input to the appropriate memory module. When the carry select signal is inactive, the ODA start value is presented to the appropriate module. This operation from module 0 is accomplished by 2:1 multiplexor 82.

The column address field and the row address field in BAMDA 16 are both sequential in nature when going in the x and y directions, respectively. This sequential nature of the address field also applies when crossing the boundaries of partition sector 24. In order to generate the proper sequential SDA to the memory module containing the starting bit, the SDA starting bit generated at the output of adder 71 is used. In order to generate the proper sequential SDA to the second bit in the memory access string, the SDA starting bit generated at the output of adder 71 is incremented by one. Consequently, for each consecutive bit in the access string, a new sequential same direction bit must be generated. The sequential SDA fields are swapped from row to column address fields and vice versa, depending on the direction of access to BAMDA 16. When accessing BAMDA 16 in the x-direction, the sequential SDA forms the column addresses. While accessing BAMDA 16 in the y-direction, the sequential SDA forms the row addresses. Thus, a sequential SDA bit is generated by adding the SDA starting bit to the module pointer value of the memory module that is to receive the sequential address.

Write width input 51 indicates how many bits are to be written into BAMDA 16. When write width 51 is set to 0, all bits are written into BAMDA 16. When write width 51 is set to 1, all bits except one are written into BAMDA 16. A write module signal for each of memory modules M0-M3 is generated by writing the write width input 51 to the module pointer value for the given memory module. For example, for memory module M0 this addition takes place in adder 83, which has write width input 51 and the output of one's complement 74 as its inputs. The write module 0 signal is then provided over line 84. If a carry condition does not occur from the add operation that takes place in adder 83, then the memory bit is written into BAMDA 16 over line 84.

While this invention has been particularly shown and described with reference to a preferred embodiment thereof, it will be understood by those skilled in the art that the foregoing and other changes in form and detail may be made therein without departing from the spirit and scope of the invention.

What is claimed is:

1. An improved method of accessing bit strings in a multi-dimensional memory array made up of a plurality n of hardware one bit wide memory modules for use with an all points addressable display comprising the steps of:
    arranging representations of positions of said display in said array so that vertically sequential positions in a given column correspond to bits in sequential ones of said n memory modules;
    providing a row/column indicator as a start location for accessing a bit string in said array;
    setting a directional indicator for indicating whether the bit string is to be accessed in a horizontal direction or in a vertical direction;
    providing length for the bit string to be accessed; and
    accessing during each memory cycle the bit string in said array in response to said setting step each of said n modules simultaneously in said vertical direction or alternately in said horizontal direction.

2. The method of claim 1 wherein the accessing step includes:
    generating an n bit row and an n bit column address for each module over a common set of multiplex address lines.

3. The methods of claims 1 or 2 including the additional step of:
    selecting a partition sector, corresponding in size to the number of bits in one of said plurality of modules, from a plurality of partition sectors corresponding to the number n of modules in said array.

4. The method of claim 1 wherein the providing step includes:
    identifying which of said n modules contains the first bit of the bit string.

5. The method of claims 1, 2 or 4 additionally including the step of:
    generating write module signals for selectively altering bits in said array.

6. The method of claim 3 including the step of:
    using a partition to logically position bits within said array in sub-arrays of varying sizes.

* * * * *